United States Patent
Yamada et al.

(10) Patent No.: US 12,117,340 B2
(45) Date of Patent: Oct. 15, 2024

(54) LIGHT SOURCE APPARATUS FOR LIGHT MEASUREMENT

(71) Applicant: Ushio Denki Kabushiki Kaisha, Tokyo (JP)

(72) Inventors: Go Yamada, Tokyo (JP); Takuma Yokoyama, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 78 days.

(21) Appl. No.: 17/598,770

(22) PCT Filed: Mar. 25, 2020

(86) PCT No.: PCT/JP2020/013498
§ 371 (c)(1),
(2) Date: Sep. 27, 2021

(87) PCT Pub. No.: WO2020/196689
PCT Pub. Date: Oct. 1, 2020

(65) Prior Publication Data
US 2022/0170791 A1 Jun. 2, 2022

(30) Foreign Application Priority Data

Mar. 27, 2019 (JP) .................. 2019-062000

(51) Int. Cl.
*G01J 3/18* (2006.01)
*G01J 3/10* (2006.01)
(Continued)

(52) U.S. Cl.
CPC . *G01J 3/10* (2013.01); *G01J 3/14* (2013.01); *G01J 3/18* (2013.01); *G02F 1/365* (2013.01); *G02F 2201/305* (2013.01)

(58) Field of Classification Search
CPC ........ G01J 3/10; G01J 3/14; G01J 3/18; G01J 3/28; G01J 3/0218; G01J 3/32;
(Continued)

(56) References Cited

U.S. PATENT DOCUMENTS 3,838,278 A * 9/1974 Duguay .................. H04J 14/08
250/227.12
3,925,727 A * 12/1975 Duguay ............... G02B 6/2861
250/227.12

(Continued)

FOREIGN PATENT DOCUMENTS

JP H08122833 A 5/1996
JP H0915661 A 1/1997
(Continued)

OTHER PUBLICATIONS

International Search Report (PCT/ISA/210) with translation and Written Opinion (PCT/ISA/237) dated Jun. 23, 2020, by the Japan Patent Office as the International Searching Authority for International Application No. PCT/JP2020/013498.
(Continued)

*Primary Examiner* — Abdullahi Nur
(74) *Attorney, Agent, or Firm* — BUCHANAN, INGERSOLL & ROONEY PC

(57) ABSTRACT

To provide a light source apparatus for light measurement in which time wavelength uniqueness is not lost even in a case of high output, and to enable spectroscopic measurement with high accuracy and at high speed. Broadband pulsed light having a continuous spectrum over a wavelength width of at least 50 nm in a range of 900 to 1300 nm is emitted from a pulsed light source, and divided for each wavelength by a divider, and light having each wavelength is transmitted by each of stretch fibers and emitted from a coupler. The stretch fibers have different lengths such that an elapsed time
(Continued)

and the wavelength in one pulse correspond to each other on a one-to-one basis at an emission end.

14 Claims, 10 Drawing Sheets

(51) Int. Cl.
  *G01J 3/14* (2006.01)
  *G02F 1/365* (2006.01)
(58) Field of Classification Search
  CPC .. G01J 3/1895; G02F 1/365; G02F 2201/305; G01N 21/359
  See application file for complete search history.

(56) References Cited

U.S. PATENT DOCUMENTS

| | | | | |
|---|---|---|---|---|
| 5,010,346 | A * | 4/1991 | Hamilton | G02F 7/00 250/227.12 |
| 5,694,408 | A * | 12/1997 | Bott | H01S 3/2383 372/98 |
| 6,295,395 | B1 * | 9/2001 | Paek | G02B 6/29311 385/24 |
| 6,690,468 | B1 | 2/2004 | Benzel et al. | |
| 7,184,144 | B2 | 2/2007 | Sanders | |
| 7,403,143 | B2 * | 7/2008 | Hirono | G02F 7/00 341/137 |
| 7,630,083 | B2 * | 12/2009 | de Boer | G01B 9/02032 356/479 |
| 8,514,485 | B2 * | 8/2013 | Rothenberg | G02B 6/02042 385/38 |
| 2005/0226635 | A1 * | 10/2005 | Lonov | G02F 7/00 398/161 |
| 2006/0132793 | A1 | 6/2006 | Ogawa | |
| 2009/0010646 | A1 * | 1/2009 | Sasaki | H04J 14/005 398/43 |
| 2013/0342895 | A1 * | 12/2013 | Chann | H01S 3/1307 359/338 |
| 2014/0340634 | A1 * | 11/2014 | Kuranov | A61B 3/14 351/206 |
| 2014/0363126 | A1 * | 12/2014 | Kat | G01D 5/35387 385/37 |
| 2017/0075064 | A1 * | 3/2017 | Docter | G01D 5/35316 |
| 2017/0122806 | A1 * | 5/2017 | Capelle | H01S 3/08086 |
| 2019/0003820 | A1 * | 1/2019 | Van Leeuwen | G01B 9/02051 |

FOREIGN PATENT DOCUMENTS

| | | |
|---|---|---|
| JP | 2001091357 A | 4/2001 |
| JP | 2002162345 A | 6/2002 |
| JP | 2002310729 A | 10/2002 |
| JP | 2003279480 A | 10/2003 |
| JP | 2004233341 A | 8/2004 |
| JP | 2013205390 A | 10/2013 |
| JP | 2019045271 A | 3/2019 |
| WO | 2005015149 A1 | 2/2005 |

OTHER PUBLICATIONS

Office Action (Notice of Reasons for Refusal) dated Jul. 6, 2021, by the Japan Patent Office in corresponding Japanese Patent Application No. 2019-062000 and an English Translation of the Office Action.
Office Action (Notice of Reasons for Refusal) dated Mar. 2, 2021, by the Japan Patent Office in corresponding Japanese Patent Application No. 2019-062000 and an English Translation of the Office Action.
Extended European Search Report dated Dec. 9, 2022, issued in corresponding European Application No. 20779848.9. (8 pages).
Ziyi Meng et al., "Multimode Fiber Spectrometer With Scalable Bandwidth Using Space-Division Multiplexing", AIP Advances, Jan. 8, 2019, vol. 9, 0150041-6, XP012234446. (7 pages).
JP Notice of Reasons for Refusal issued in JP Application No. 2022-042987; Mailed Feb. 28, 2023. 8 Pages (with Translation).
First Notice of Reasons for Refusal dated Nov. 1, 2023, issued in the corresponding Chinese Patent Application No. 202080018895.5, 12 pages including 4 pages of English Translation.

* cited by examiner

FIG.6 (1)
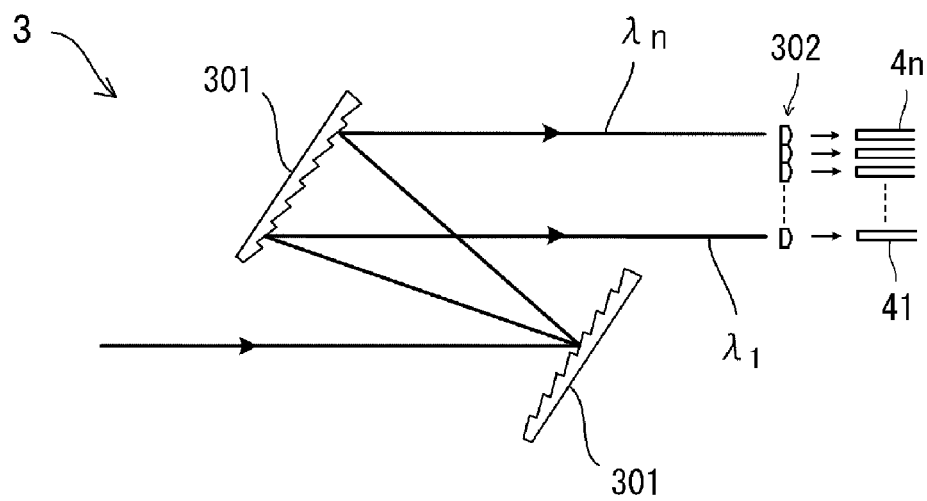
FIG.6 (2)
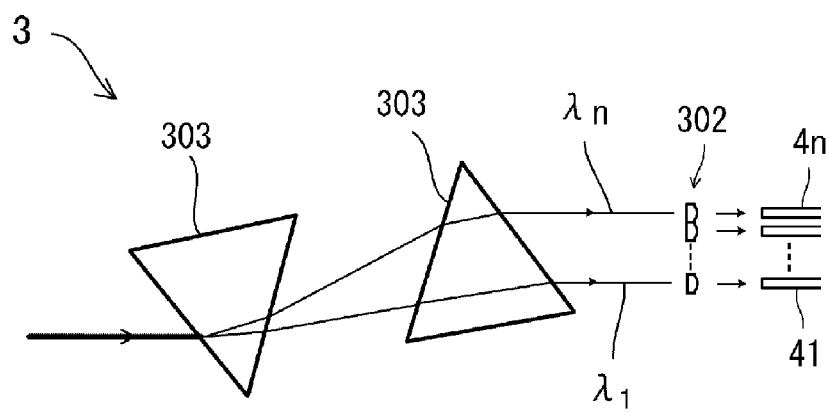

FIG. 9

| INTRA-PULSE TIME | WAVELENGTH | REFERENCE SPECTRUM DATA | MEASUREMENT VALUE | ABSORPTION SPECTRUM |
|---|---|---|---|---|
| $t_1$ | $\lambda_1$ | $V_1$ | $v_1$ | $v_1/V_1$ |
| $t_2$ | $\lambda_2$ | $V_2$ | $v_2$ | $v_2/V_2$ |
| $t_3$ | $\lambda_3$ | $V_3$ | $v_3$ | $v_3/V_3$ |
| ... | ... | ... | ... | ... |
| $t_{n-2}$ | $\lambda_{n-2}$ | $V_{n-2}$ | $v_{n-2}$ | $v_{n-2}/V_{n-2}$ |
| $t_{n-1}$ | $\lambda_{n-1}$ | $V_{n-1}$ | $v_{n-1}$ | $v_{n-1}/V_{n-1}$ |
| $t_n$ | $\lambda_n$ | $V_n$ | $v_n$ | $v_n/V_n$ |

LIGHT SOURCE APPARATUS FOR LIGHT MEASUREMENT

BACKGROUND

1. Technical Field

The disclosure relates to a light source apparatus for light measurement that emits broadband pulsed light.

2. Description of the Related Art

A typical pulsed light source is a pulse oscillation laser (pulsed laser). In recent years, research to broaden the wavelength of the pulsed laser has been actively conducted, and a typical example thereof is generation of super continuum light (hereinafter, referred to as SC light) using a nonlinear optical effect. The SC light is light obtained by passing light from a pulse laser source through a nonlinear element such as a fiber and broadening the wavelength by a nonlinear optical effect such as self-phase modulation or stimulated Raman scattering.

The broadband pulsed light described above is extended as a wavelength region, but remains narrow as a pulse width (time width). However, when a group delay in a transmission medium such as a fiber is used, the pulse width can also be stretched. At this time, when an element having an appropriate dispersion characteristic is selected, pulse stretch can be performed in a state where the elapsed time (time) and the wavelength in the pulse correspond to each other on a one-to-one basis. The pulsed light in a state where the elapsed time and the wavelength in the pulse correspond to each other on a one-to-one basis as described above may be referred to as chirped pulsed light or linearly chirped pulsed light.

The correspondence relationship between the elapsed time and the wavelength in the broadband pulsed light which is time-stretched in this manner (hereinafter, referred to as broadband time-stretched pulsed light) can be effectively used for spectroscopic measurement. That is, in a case where the broadband time-stretched pulsed light is received by a certain detector, a temporal change of the light intensity detected by the detector corresponds to the light intensity of each wavelength, that is, a spectrum. Therefore, a temporal change of output data of the detector can be converted into a spectrum, and spectroscopic measurement can be performed without using a special dispersive element such as a diffraction grating. That is, by irradiating a sample with the broadband time-stretched pulsed light, receiving light from the sample by the detector, and measuring the temporal change, the spectral characteristic (for example, spectral transmittance) of the sample can be measured.

As described above, the broadband time-stretched pulsed light is considered to be particularly useful in the field of spectroscopic measurement and the like. However, according to the research of the inventor, it has been found that when the output of the pulsed light source is increased to output stronger light, an unintended nonlinear optical effect occurs in a pulse stretch element, and uniqueness of elapsed time and wavelength (one-to-one correspondence) is lost. When the uniqueness of elapsed time and wavelength is lost, in particular, when the light is used for spectroscopic measurement, the measurement accuracy is significantly deteriorated.

SUMMARY

The present disclosure is based on this finding An outline of several example embodiments of the disclosure follows. This outline is provided for the convenience of the reader to provide a basic understanding of such embodiments and does not wholly define the breadth of the disclosure. This outline is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "one embodiment" may be used herein to refer to a single embodiment or multiple embodiments of the disclosure.

A light source apparatus for light measurement according to the present disclosure is structured to output pulsed light having a continuous spectrum in which an elapsed time and a wavelength in one pulse correspond to each other on a one-to-one basis. The light source apparatus includes: a pulsed light source structured to emit pulsed light having a continuous spectrum; a divider structured to spatially divide the pulsed light emitted from the pulsed light source into a plurality of optical paths according to a wavelength; and a plurality of fibers in a number corresponding to a number of wavelengths divided by the divider. Each of the fibers has an incident end located at a position where light having a corresponding wavelength spatially divided by the divider is incident, and the fibers have different length according to the wavelengths of the incident light.

In one embodiment, in the light source apparatus for light measurement, the divider may be an arrayed waveguide grating.

In one embodiment, the light source apparatus for light measurement may have a configuration in which the divider includes a diffraction grating and an optical system structured to condense light dispersed by the diffraction grating at different positions according to the wavelength, and an incident end of each of the fibers may be disposed at a corresponding focus position.

In one embodiment, the light source apparatus for light measurement may have a configuration in which the plurality of fibers includes a plurality of fiber sets and a multicore fiber. Each of the fiber sets includes a plurality of element fibers having the same pattern and different lengths. The cores of the element fibers in one of the fiber sets are coupled to cores of the multicore fiber, and a number and a length of the multicore fiber are determined such that total lengths of transmission paths including the cores of the element fibers and the cores of the multicore fiber are different from each other.

In one embodiment, in the light source apparatus for light measurement, the pulsed light source may be a light source structured to emit super continuum light.

In one embodiment, a spectroscopic measurement apparatus according to the present disclosure includes: a pulsed light source structured to emit pulsed light having a continuous spectrum; a divider structured to spatially divide the pulsed light emitted from the pulsed light source into a plurality of optical paths according to a wavelength; and a plurality of fibers in a number corresponding to a number of wavelengths divided by the divider. Each of the fibers has an incident end located at a position where light having a corresponding wavelength spatially divided by the divider is incident. The fibers have different lengths according to the wavelength of the incident light such that an elapsed time and the wavelength in one pulse correspond to each other on a one-to-one basis. The spectroscopic measurement apparatus includes: a detector disposed at a position where light from an object irradiated with light emitted from each of the plurality of fibers is incident; and a calculator structured to calculate a spectral characteristic of the object according to an output from the detector.

In one embodiment, in the spectroscopic measurement apparatus, the divider may be an arrayed waveguide grating.

In one embodiment, the spectroscopic measurement apparatus may have a configuration in which the divider includes a diffraction grating and an optical system that condenses light dispersed by the diffraction grating at different positions according to the wavelength, and an incident end of each of the fibers is disposed at a corresponding focus position.

In one embodiment, the spectroscopic measurement apparatus may have a configuration in which the plurality of fibers includes a plurality of fiber sets and a multicore fiber, each of the fiber sets includes a plurality of element fibers having the same pattern and different lengths, cores of the element fibers in one of the fiber sets are coupled to cores of the multicore fiber, and a number and a length of the multicore fiber are determined such that total lengths of transmission paths including the cores of the element fibers and the cores of the multicore fiber are different from each other.

In one embodiment, in the spectroscopic measurement apparatus, the pulsed light source may be a light source structured to emit super continuum light.

In one embodiment, a spectroscopic measurement method according to the present disclosure of this application includes:
- a division step of spatially dividing pulsed light having a continuous spectrum by a divider according to a wavelength;
- a pulse stretch step of causing beams of the pulsed light divided in the division step to be incident on and transmitted to a plurality of fibers in a number corresponding to a number of divided wavelengths, respectively, such that an elapsed time and the wavelength in one pulse correspond to each other on one-to-one basis;
- an irradiation step of irradiating an object with the pulsed light having a pulse width stretched by the pulse stretch step;
- a detection step of detecting, by a detector, light from the object irradiated with the pulsed light having the pulse width stretched by the pulse stretch step; and
- a calculation step of calculating a spectral characteristic of the object according to an output from the detector.

In one embodiment, in the spectroscopic measurement method, the divider may be an arrayed waveguide grating.

In one embodiment, the spectroscopic measurement method may have a configuration in which the divider includes a diffraction grating and an optical system that condenses light dispersed by the diffraction grating at different positions according to the wavelength, and an incident end of each of the fibers is disposed at a corresponding focus position.

In one embodiment, the spectroscopic measurement method may have a configuration in which the plurality of fibers includes a plurality of fiber sets and a multicore fiber, each of the plurality of fiber sets includes a plurality of element fibers having the same pattern and different lengths, cores of the element fibers in one of the fiber sets are coupled to cores of the multicore fiber, and a number and a length of the multicore fiber are selected such that total lengths of transmission paths including the cores of the element fibers and the cores of the multicore fiber are different from each other.

In one embodiment, in the spectroscopic measurement method, the pulsed light may be super continuum light.

According to the light source apparatus for light measurement according to one embodiment, the broadband pulsed light is divided into the light beams having the respective wavelengths by the divider, and pulse stretch is performed by the delay according to the propagation distance in each of the fibers that transmits the light having each wavelength. Therefore, there is no problem that an unintended nonlinear optical effect occurs and the time wavelength uniqueness is lost. Therefore, light measurement can be performed by irradiating the object with the broadband pulsed light with high illuminance, the broadband pulsed light having the time wavelength uniqueness ensured. Therefore, light measurement at high speed with high quality can be performed.

In one embodiment, when the divider is an arrayed waveguide grating, it is possible to obtain an effect that light irradiation with higher illuminance is possible because of low loss, and connection with each of the fibers is easy and manufacture is easy.

In one embodiment, when a plurality of fibers constitute a plurality of fiber sets having the same pattern and different lengths, cost reduction is achieved.

In one embodiment, since the light from the light source is temporally divided and radiated to the object, a time-consuming operation such as sweeping of the diffraction grating is unnecessary, and spectroscopic measurement at high speed can be performed. Further, when pulse stretch is performed with the time wavelength uniqueness secured, since a configuration is adopted in which transmission is performed for each wavelength by the different fibers having different lengths, the time wavelength uniqueness is not lost even when the object is irradiated with light with high illuminance. For this reason, it is possible to perform spectroscopic measurement that requires irradiation with high-power light with high accuracy, such as spectroscopic measurement for an object having a large amount of absorption, and a device and a method with high speed and high reliability are obtained.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIGS. 6(1) and 6(2) are schematic diagrams of a divider of another example.

FIG. 9 is a diagram schematically showing a main part of an example of a measurement program included in the spectroscopic measurement apparatus.

DESCRIPTION OF EMBODIMENTS

Next, modes (embodiments) for carrying out the invention of this application will be described.

Figure 1:
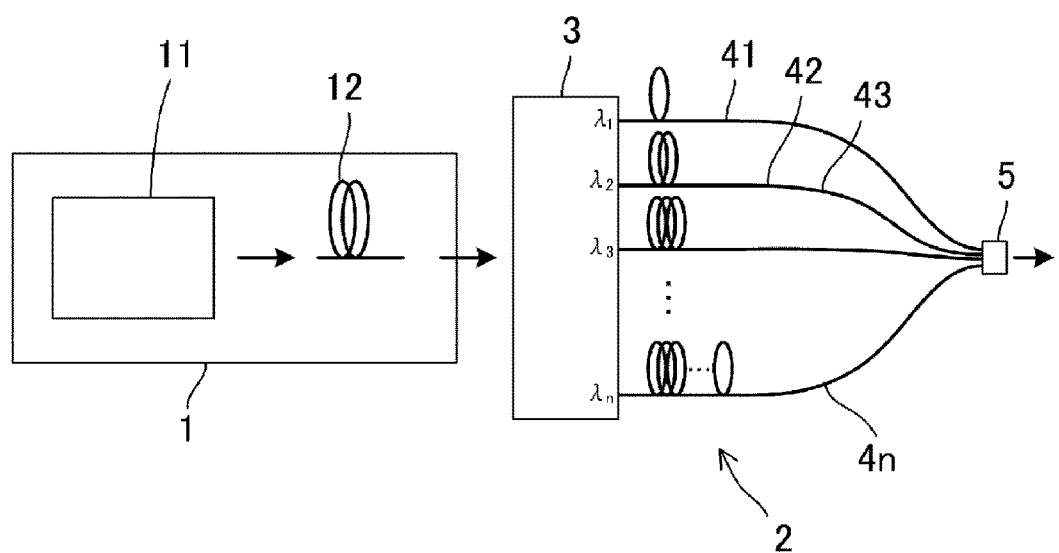
FIG. 1 is a schematic diagram of a light source apparatus for light measurement of a first embodiment.

First, embodiments of the invention of a light source apparatus for light measurement will be described. FIG. 1 is a schematic diagram of a light source apparatus for light measurement of a first embodiment. The light source apparatus for light measurement shown in FIG. 1 includes a pulsed light source 1 and a pulse stretch unit 2. The pulse stretch unit 2 is a unit that pulse-stretches light from the pulsed light source 1 such that the relationship between the elapsed time and the wavelength in one pulse is one to one.

The pulsed light source 1 is a light source that emits pulsed light having a continuous spectrum. In this embodiment, for example, the light source emits light having a continuous spectrum over a wavelength width of at least 10 nm in a range of 900 nm to 1300 nm. The "continuous spectrum over a wavelength width of at least 10 nm in a range of 900 nm to 1300 nm" means any continuous wavelength width of 10 nm or more within the range of 900 to 1300 nm. For example, for example, it may be continuous from 900 to 910 nm or may be continuous from 990 to 1000 nm. In addition, it is more preferable that the spectrum is continuous over a wavelength width of 50 nm or more, and it is still more preferable that the spectrum is continuous over a wavelength width of 100 nm or more. In addition, "the spectrum is continuous" means to include the spectrum continuous at a certain wavelength width. This is not limited to the case of being continuous in the entire spectrum of the pulsed light, and may be partially continuous.

The range of 900 nm to 1300 nm is set because the light source apparatus of the embodiment is used for light measurement in this wavelength region. The light having the continuous spectrum over the wavelength width of at least 10 nm is typically SC light. Therefore, in this embodiment, the pulsed light source 1 is an SC light source. However, other broadband pulsed light sources such as a superluminescent diode (SLD) light source may be used.

The pulsed light source 1, which is an SC light source, includes an ultrashort pulse laser 11 and a nonlinear element 12. As the ultrashort pulse laser 11, a gain-switched laser, a microchip laser, a fiber laser, or the like can be used. A fiber is often used as the nonlinear element 12. For example, a photonic crystal fiber or other nonlinear fibers can be used as the nonlinear element 12. The mode of the fiber is often a single mode, but even a multimode can be used as the nonlinear element 12 as long as it exhibits sufficient nonlinearity.

The pulse stretch unit 2 forms a major feature of the light source apparatus of the embodiment. The light emitted from the pulsed light source 1 spreads as a wavelength band, but remains as a short pulse on the order of femtoseconds to nanoseconds as a pulse width. Since it is difficult to use it for light measurement as it is, pulse stretch is performed by the pulse stretch unit 2. What is important at this time is that a configuration of performing extension such that the relationship between the elapsed time and the wavelength in one pulse is one to one is adopted. At this time, the light source apparatus of the embodiment adopts a configuration constructed such that an unintended nonlinear optical effect is not generated.

Figure 2:
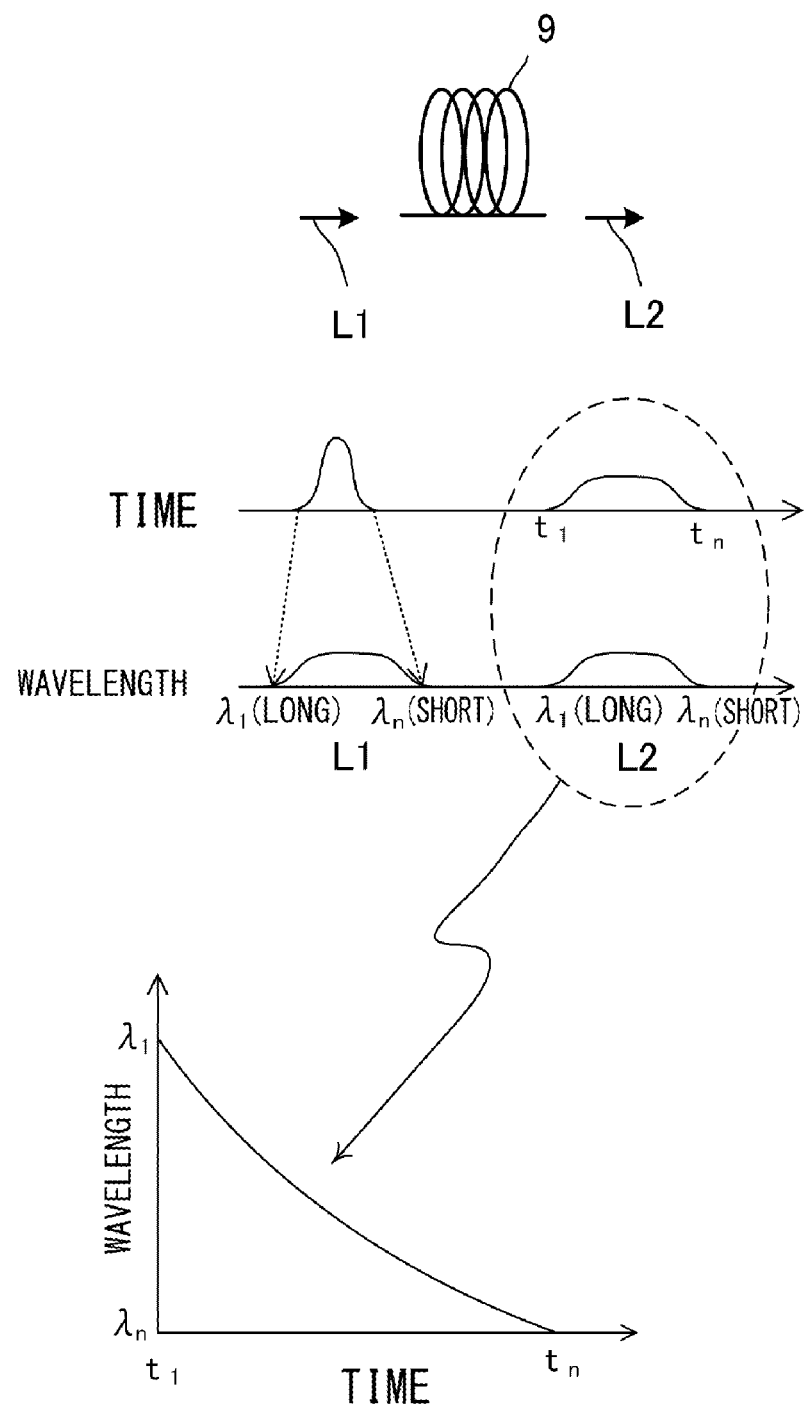
FIG. 2 is a schematic diagram showing a principle of pulse stretch of broadband pulsed light.

When broadband pulsed light is pulse-stretched, an unintended nonlinear optical effect occurs, and time wavelength uniqueness is lost, which is a problem confirmed in the course of research by the inventors. Hereinafter, this point will be described with reference to FIG. 2. FIG. 2 is a schematic diagram showing a principle of pulse stretch of the broadband pulsed light.

As means for stretching the pulse width of the broadband pulsed light such as SC light, a configuration using a fiber having a specific group delay characteristic such as a dispersion compensation fiber (DCF) is suitably adopted. For example, when SC light L1 having a continuous spectrum in a certain wavelength range is passed through a group delay fiber 9 having a positive dispersion characteristic in the wavelength range, the pulse width is effectively stretched. That is, as shown in FIG. 2, in the SC light L1, light having a longest wavelength $\lambda_1$ at the beginning of one pulse though it is an ultrashort pulse exists, light having a shorter wavelength gradually exists as time elapses, and light having a shortest wavelength $\lambda_n$ exists at the end of the pulse. When this light is passed through the normally dispersed group delay fiber 9, in the normally dispersed group delay fiber 9, light having a shorter wavelength propagates with a delay. Therefore, a time difference in one pulse is increased, and when being emitted from the fiber 9, the light having a shorter wavelength is further delayed as compared with light having a longer wavelength. As a result, SC light L2 to be emitted is light having the stretched pulse width in a state where uniqueness of time to wavelength is secured. That is, as shown on the lower side of FIG. 2, in times $t_1$ to $t_n$, pulse stretch is performed in a one-to-one correspondence with the wavelengths $\lambda_1$ to $\lambda_n$.

It is also possible to use an anomalous dispersion fiber as the group delay fiber 9 for pulse stretch. In this case, in the SC light, the light on the long wavelength side existing at the beginning of the pulse is delayed, and the light on the short wavelength side existing at the later time is dispersed in the traveling state. Therefore, the temporal relationship in one pulse is reversed, and pulse stretch is performed in the state where the light on the short wavelength side exists at the beginning of one pulse and the light on the longer wavelength side exists with the lapse of time. However, as compared with the case of normal dispersion, it is often necessary to further increase the propagation distance for pulse stretch, and the loss tends to be large. Therefore, normal dispersion is preferable in this respect.

In pulse stretch using such a group delay fiber, in the field of light measurement, it may be necessary to increase the intensity of the broadband pulsed light caused to be incident on the fiber. For example, in the case of measuring an absorption spectrum by irradiating an object having a large amount of absorption with light and dispersing the transmitted light, it is necessary to irradiate the object with strong light, and thus it is necessary to stretch the strong light. In addition, from the viewpoint of increasing an SN ratio of the measurement or performing the measurement at high speed, it may be necessary to irradiate the object with strong light.

Figure 3:
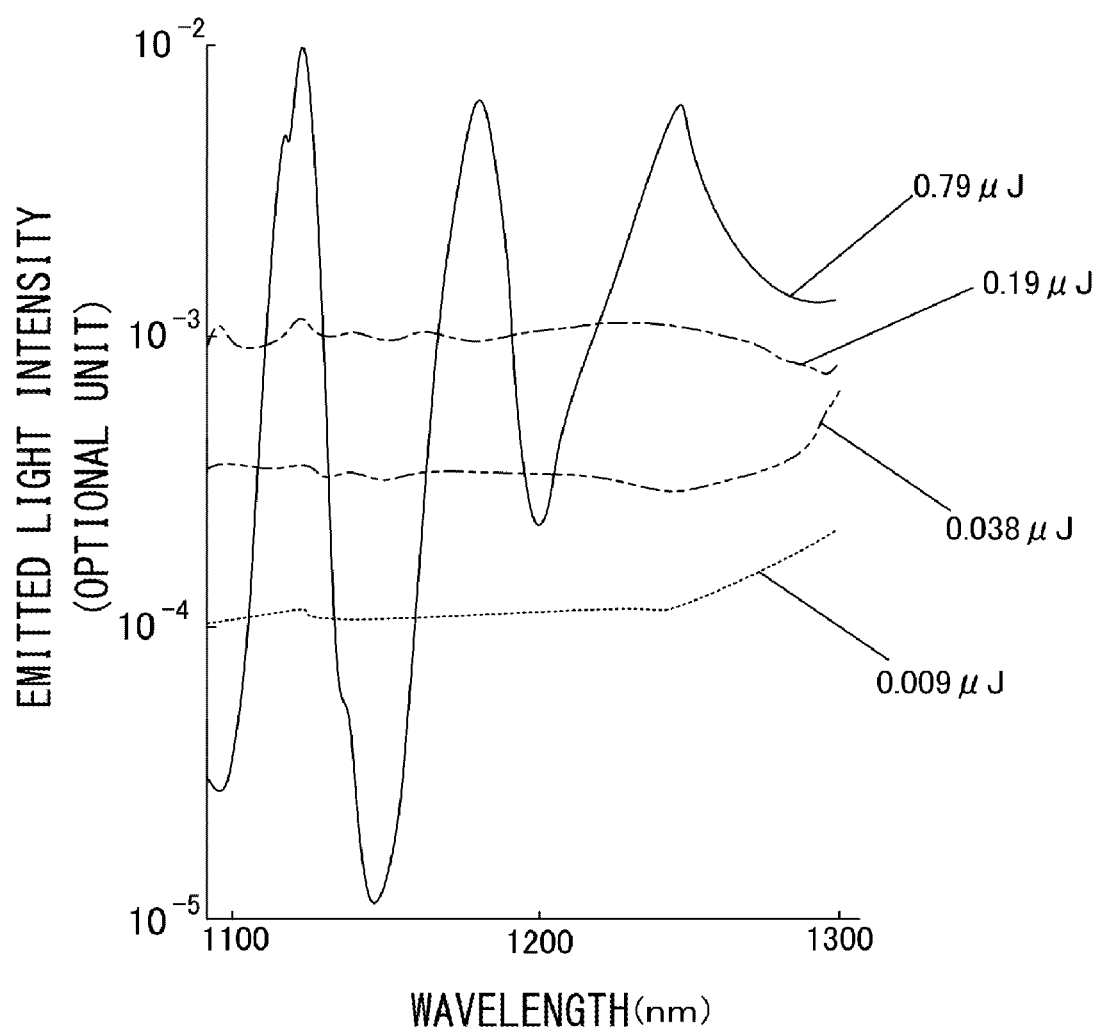
FIG. 3 is a diagram showing a result of an experiment in which an unintended nonlinear optical effect in a case of pulse-stretched high-intensity broadband pulsed light with a group delay fiber is confirmed.

In order to irradiate the object with the pulse-extended light with high illuminance, it is necessary to cause broadband pulsed light to be incident on the group delay fiber with high intensity and to perform pulse stretch while maintaining high intensity. However, when the high-intensity broadband pulsed light is incident on the group delay fiber, an unintended nonlinear optical effect may occur, and the time wavelength uniqueness may be lost. FIG. 3 is a diagram showing a result of an experiment for confirming this point.

FIG. 3 is a diagram showing a result of an experiment in which an unintended nonlinear optical effect in the case of pulse-stretching the high-intensity broadband pulsed light with the group delay fiber is confirmed. In FIG. 3, the vertical axis is a logarithmic scale.

In the experiment showing the results in FIG. 3, microchip laser light having a center wavelength of 1064 nm and a pulse width of 2 nanoseconds was introduced in a photonic crystal fiber as a nonlinear element to obtain SC light, and a single-mode fiber having a length of 5 km was used as a group delay fiber to perform pulse stretch. The single-mode fiber is a normally dispersed fiber in a range of 1100 to 1200 nm. At this time, the energy of the incident SC light to the single-mode fiber was changed to 0.009 µJ, 0.038 µJ, 0.19 µJ, and 0.79 µJ.

As shown in FIG. 3, when the energy of the SC light is up to 0.19 µJ, there is no large variation in the emitted light intensity in the wavelength range of 1100 to 1200 nm, but when the energy of the SC light is 0.79 µJ, the emitted light intensity drastically fluctuates according to the wavelength. Such a variation indicates that an unintended further nonlinear optical effect has occurred in the SC light in the process of being incident on and propagating through the single-mode fiber as the group delay fiber. When such a nonlinear optical effect occurs, a new wavelength is generated at another time, so that the time wavelength uniqueness is lost. In the experiment showing the results in FIG. 3, since the pulse width of the incident SC light has not changed, it means that the peak value has been changed.

The inventor has optimized the configuration of pulse stretch based on such findings. Specifically, as shown in FIG. 1, the light source apparatus for light measurement of the embodiment includes the pulse stretch unit 2 that extends the pulse width of the broadband pulsed light from the pulsed light source 1, and the pulse stretch unit 2 includes a divider 3 and a plurality of fibers (hereinafter, referred to as stretch fibers) 41 to 4n.

The divider 3 is an element that spatially divides the pulsed light emitted from the pulsed light source 1 according to the wavelength. As shown in FIG. 1, the stretch fibers 41 to 4n are coupled in parallel to the divider 3. An incident end of each of the stretch fibers 4 is disposed at a position where light having a corresponding wavelength spatially divided by the divider 3 is incident. That is, when the divider 3 divides the broadband pulsed light into light beams having wavelengths $\lambda_1$ to $\lambda_n$, the incident end of the stretch fiber 41 is disposed at the emission position of the light having the corresponding wavelength $\lambda_1$, the incident end of the stretch fiber 42 is disposed at the emission position of the light having the corresponding wavelength $\lambda_2$, and the fiber 4n is disposed at the emission position of the light having the corresponding wavelength $\lambda_n$.

The length of each of the stretch fibers 41 to 4n depends on the corresponding incident wavelength (connection position with respect to the divider 3). The length of each of the stretch fibers 41 to 4n is determined such that the relationship between the elapsed time and the wavelength in one pulse is one to one at the emission end of each of the stretch fibers 41 to 4n. In this embodiment, similarly to the above, since the light on the long wavelength side exists at the beginning of one pulse and pulse stretch is performed while maintaining the relationship in which the light on the short wavelength side gradually exists with the lapse of time, the length of the stretch fiber that transmits the light having the short wavelength becomes longer. That is, when $\lambda_1$ is the longest wavelength, $\lambda n$ is the shortest wavelength, and the lengths of the stretch fibers 41, 42, . . . , and 4n are $m_1$, $m_2$, . . . $m_n$, $m_1 < m_2 < \ldots < m_n$ holds.

As a more specific example, 20 single-mode fibers having different lengths in increments of 1 m from 1 to 20 m can be used as the stretch fibers 41 to 4n.

Since the difference in length is optimized in this manner, each of the stretch fibers 41 to 4n is not necessarily a specific group delay fiber. That is, it is not essential to adopt a fiber having an appropriate group delay characteristic according to the wavelength. Using the same fibers (fibers of the same core/cladding material) having different lengths according to wavelength, the time wavelength uniqueness at each emission end is achieved. In this sense, each of the stretch fibers 41 to 4n may be a multimode fiber. In terms of preventing unintended nonlinear optical effects, the multimode fiber may be more preferable than the single-mode fiber.

In any case, since the difference in length of the stretch fibers 41 to 4n is optimized, when the broadband pulsed light is divided into the light beams having respective wavelengths to propagate through the stretch fibers 41 to 4n, the time wavelength uniqueness is achieved at each emission end. That is, the divided light beams are delayed according to the wavelength, the length of each of the stretch fibers 41 to 4n, and the refractive index of the core. Therefore, if the length of each of the stretch fibers 41 to 4n is appropriately selected according to the wavelength and the core refractive index, the time wavelength uniqueness is achieved at each emission end. When the difference between the wavelengths divided by the divider 3 is $\Delta\lambda$ and the difference between the lengths of the stretch fibers 41 to 4n is $\Delta m$, $\Delta m$ may not be constant even if $\Delta\lambda$ is constant (the interval between the wavelengths is constant). This is because, even if each of the stretch fibers 41 to 4n is not a group delay fiber, the group delay has wavelength dependency, and thus there is a case where a difference is made in $\Delta m$ in consideration of the wavelength dependency.

In addition, the same fibers (fibers having the same characteristics) are used as the stretch fibers 41 to 4n, but fibers having different characteristics may be used. When the fibers having different characteristics are used, the difference in length is appropriately selected according to the difference in characteristic.

After the pulse stretch, although the times $t_1$ to $t_n$ and the wavelengths $\lambda_1$ to $\lambda_n$ correspond to each other on a one-to-one basis, the times $t_1$ to $t_n$ may be discrete times. That is, there may be such a state that after the light having the wavelength $\lambda_1$ is observed at the time $t_1$, there is a time interval (there is a time zone in which no light exists), the light having the wavelength $\lambda_2$ is observed at the time $t_2$, . . . . Even in this state, since the wavelength is specified by specifying the time, it can be said that the time wavelength uniqueness is secured. Of course, the wavelength may continuously change with continuous change in time.

As shown in FIG. 1, in this embodiment, a coupler 5 is provided at the emission end of each of the stretch fibers 41 to 4n. The coupler 5 is an element that superimposes beams emitted from the emission ends of the respective stretch fibers 41 to 4n so as to be radiated to the same irradiation region. As the coupler 5, in addition to a fusion type fiber coupler, a mechanism for holding the emission end of each of the stretch fibers 41 to 4n so that the same irradiation region is irradiated, or an optical system such as a lens may be adopted. A fan-in/fan-out device may also be used as the coupler 5. Furthermore, an optical coupler using a planar optical circuit or an arrayed waveguide grating can also be used.

Figure 4:
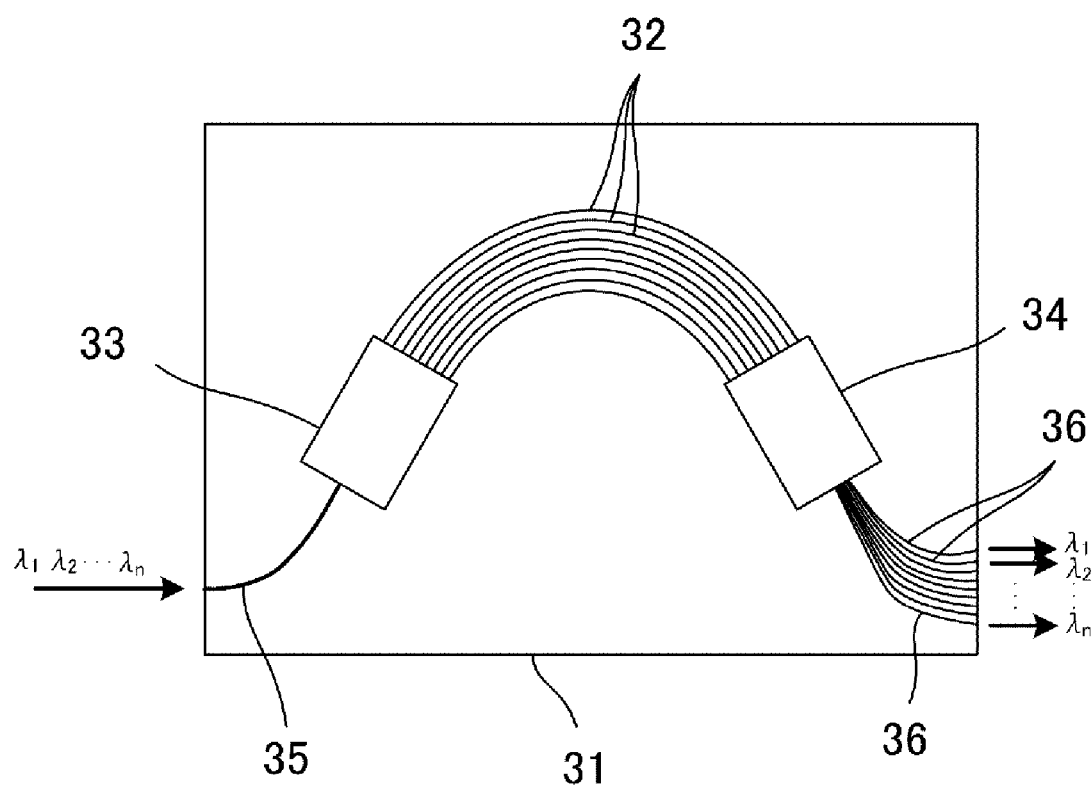
FIG. 4 is a schematic plan diagram of an arrayed waveguide grating adopted as a divider.

Next, the divider 3 will be described more specifically. In this embodiment, an arrayed waveguide grating is adopted as the divider 3. FIG. 4 is a schematic plan diagram of the arrayed waveguide grating adopted as the divider 3.

As shown in FIG. 4, the arrayed waveguide grating is configured by forming functional waveguides 32 to 36 on a substrate 31. The functional waveguides include a large number of arrayed waveguides 32 having optical path lengths slightly different from each other, slab waveguides 33 and 34 coupled to both ends (incident side and emission side) of the arrayed waveguides 32, an incident-side waveguide 35 that causes light to be incident on the incident-side slab waveguide 33, and emission-side waveguides 36 that extract light having each wavelength from the emission-side slab waveguide 34.

The slab waveguides 33 and 34 are free spaces, and light incident through the incident-side waveguide 35 spreads in the incident-side slab waveguide 33 and is incident on each arrayed waveguide 32. Since the lengths of the arrayed waveguides 32 are slightly different from each other, the phases of the light beams reaching the ends of the arrayed waveguides 32 are shifted by the difference. The light is diffracted and emitted from each arrayed waveguide 32, but the diffracted light beams pass through the emission-side slab waveguide 34 while interfering with each other and reach the incident ends of the emission-side waveguides 36. At this time, the interference light has the highest intensity at a position corresponding to the wavelength due to the phase shift. That is, the light beams having different wavelengths are sequentially incident on the emission end waveguides 36, and the light is spatially dispersed. Strictly speaking, each of the emission-side waveguides 36 is formed such that each incident end is located at such a position that the light is dispersed in such a manner.

The arrayed waveguide grating as shown in FIG. 4 has been developed for wavelength division multiplex communication (WDM) in the field of optical communication, but the inventors have found that the arrayed waveguide grating can be used as the divider 3 for pulse stretch in the light source apparatus of the embodiment although the application and the wavelength region are greatly different.

Such an arrayed waveguide grating can be produced, for example, by surface-treating the substrate 31 made of silicon. Specifically, a cladding layer ($SiO_2$ layer) is formed on the surface of the silicon substrate 31 by a flame deposition method, a $SiO_2$—$GeO_2$ layer for a core is similarly formed by a flame deposition method, and then the $SiO_2$—$GeO_2$ layer is patterned by photolithography to form the waveguides 32 to 36. The line width of each arrayed waveguide 32 may be, for example, about 5 to 6 μm.

For example, when used for light having a continuous spectrum over a wavelength width of about 900 to 1300 nm, the number of the emission-side waveguides 36 is about 128, and light is divided into wavelengths different by 3 to 50 nm and emitted.

The stretch fibers 41 to 4n are coupled to the emission-side waveguides 36 of the arrayed waveguide grating, respectively. Therefore, the light beams spatially divided according to the wavelength as described above are incident on the stretch fibers 41 to 4n, and the light beams having the respective wavelengths are transmitted by the different stretch fibers 41 to 4n and are given with different delay times.

Next, the overall operation of the light source apparatus for light measurement of the embodiment as described above will be described.

The coupler 5 is disposed at a predetermined position according to the purpose of light measurement. The ultrashort pulsed light emitted from the ultrashort pulse laser 11 is broadened by the nonlinear element 12 to become broadband pulsed light, and is incident on the divider 3. Then, the light is spatially divided according to the wavelength by the divider 3, and the light having each wavelength is incident on each of the stretch fibers 41 to 4n. The light having each wavelength is delayed in each of the stretch fibers 41 to 4n, and is emitted from each of the stretch fibers 41 to 4n in a state where the time wavelength uniqueness is achieved. Then, the emitted light is radiated to the irradiation region where the coupler 5 is directed.

According to the light source apparatus for light measurement of the embodiment as described above, the broadband pulsed light is divided into the light beams having the respective wavelengths by the divider 3, and pulse stretch is performed by the delay according to the propagation distance in each of the stretch fibers 41 to 4n that transmits the light having each wavelength. Therefore, an unintended nonlinear optical effect and the time wavelength uniqueness is preserved. That is, since the power of the broadband pulsed light is dispersed and propagates through each of the stretch fibers 41 to 4n, the power of the light propagating through each of the stretch fibers 41 to 4n can be suppressed to be low even when the high-power broadband pulsed light is emitted from the pulsed light source 1. Therefore, the time wavelength uniqueness is not lost. Since the light beams from the stretch fibers 41 to 4n are superimposed on each other by the coupler 5, the object can be irradiated with the extended high-power broadband pulsed light. Therefore, it is possible to perform light measurement with a high SN ratio even for an object having large absorption.

In addition, since the arrayed waveguide grating used as the divider 3 has a low loss, it is possible to perform light emission with higher illuminance. In addition, the arrayed waveguide grating has high affinity with a fiber, and is easily coupled to each stretch fiber. Therefore, there is an effect that manufacture is easy.

Figure 5:
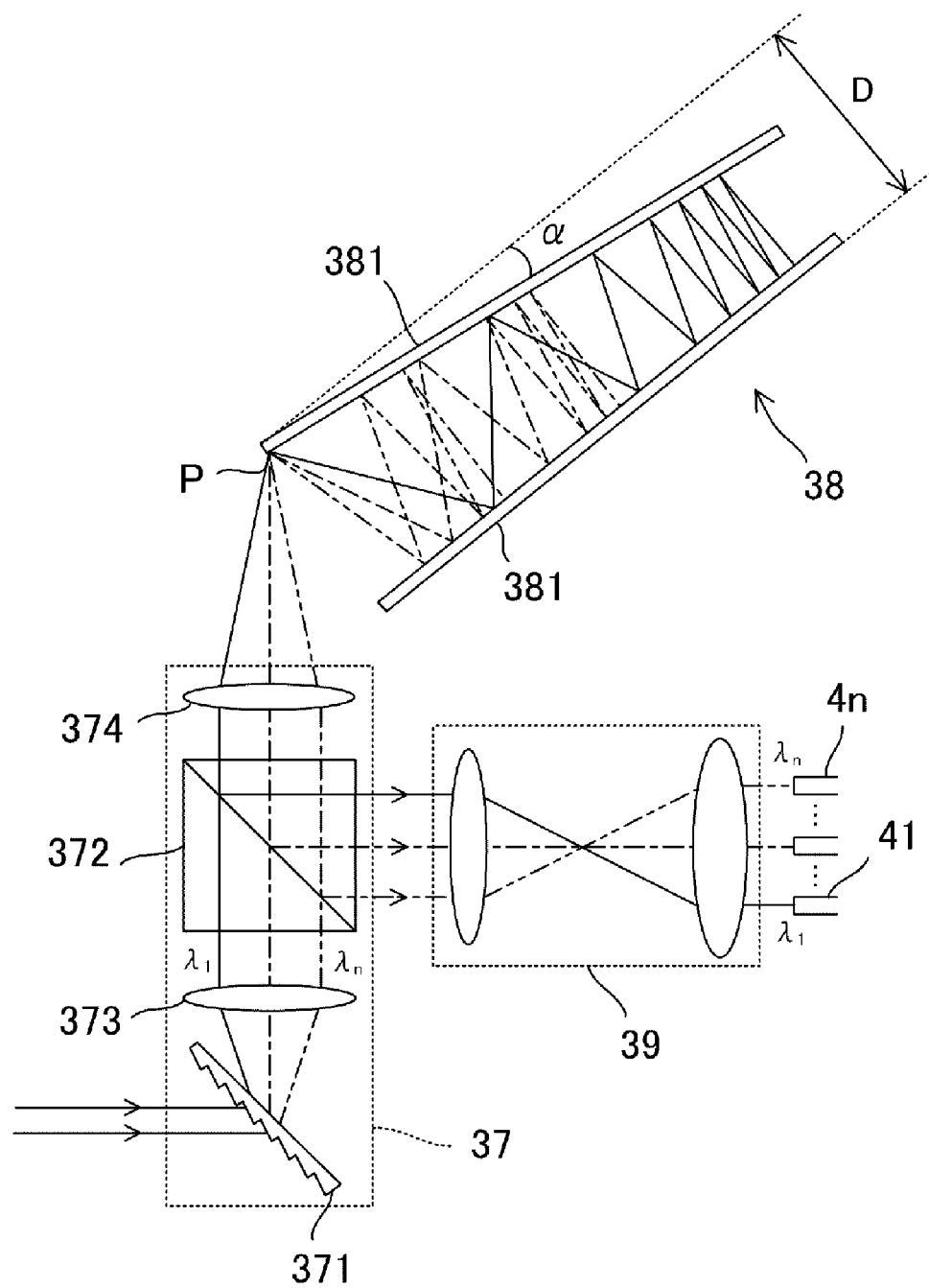
FIG. 5 is a schematic diagram of a divider of another example.

Next, another example of the divider 3 will be described. FIG. 5 is a schematic diagram of a divider 3 of another example. In the above embodiment, the arrayed waveguide grating is used as the divider 3, but the example of FIG. 5 is an example in which a diffraction grating 371 is used as the divider 3. In this example, by combining the diffraction grating 371 and a non-parallel mirror pair 38, light is condensed at different positions according to the wavelength.

Specifically, the divider 3 includes an angular dispersion module 37 that makes the angle with respect to the optical axis different according to the wavelength, the non-parallel mirror pair 38 coupled to the angular dispersion module 37, a beam splitter 372 that extracts the light having each wavelength folded back by the non-parallel mirror pair 38, and an incident optical system 39 that causes the light having each wavelength extracted by the beam splitter 372 to be incident on each of the stretch fibers 41 to 4n.

As shown in FIG. 5, the angular dispersion module 37 includes a diffraction grating 371 on which the broadband pulsed light is incident, a collimator lens 373 that converts the light wavelength-dispersed by the diffraction grating 371 into parallel light, and a condenser lens 374 that connects the light converted into the parallel light by the collimator lens 373 to an incident point P of the non-parallel mirror pair 38. The extraction beam splitter 372 is disposed between the collimator lens 373 and the condenser lens 374.

The light having each wavelength dispersed by the diffraction grating 371 is condensed by the condenser lens 374 and coupled to the incident point P of the non-parallel mirror pair 38. The angle at which the incident point P is reached is different depending on the wavelength, and is continuously different. Since the non-parallel mirror pair 38 includes a pair of flat mirrors 381 inclined by a slight angle α, the incident light having each wavelength returns to the flat mirrors 381 while being alternately reflected as shown in FIG. 5. At this time, the light beams having the wavelengths λ1 to λn just return to the position of the incident point P by a condensing angle θ, an inclination angle α, and a separation distance D of the non-parallel mirror pair 38 seen at the incident point P when the light is focused at the incident point P although the light is scattered. Therefore, these light beams are reflected at the incident point P to reach the beam splitter 372, and are partially reflected and extracted by the beam splitter 372. The extracted light is incident on each of the stretch fibers 41 to 4n by the incident optical system 39.

In this way, the broadband pulsed light is spatially divided according to the wavelength and transmitted by each of the stretch fibers 41 to 4n. Also in this embodiment, the length of each of the stretch fibers 41 to 4n is set to a different length according to the wavelength of incident light, and the time wavelength uniqueness is achieved at the emission end. As can be seen from FIG. 5, since the light having the wavelength that just returns to the position of the incident point P has an optical path length slightly different according to the wavelength, time dispersion occurs due to this. Therefore, when the lengths of the stretch fibers 41 to 4n are selected, it is desirable to take the dispersion into consideration.

In addition to the above, various dividers other than the above may be adopted as the divider 3. Examples of these are shown in FIGS. 6(1) and 6(2). FIGS. 6(1) and 6(2) are schematic diagrams showing a divider 3 of still another example.

As the divider 3, as shown in FIG. 6(1), one using a pair of diffraction gratings 301 may be adopted. A configuration can be adopted in which light is wavelength-dispersed by the pair of diffraction gratings 301, and the light having each wavelength is incident on each of the stretch fibers 41 to 4n via a microlens array 302. The microlens array 302 is an element in which microlenses that collect light having each wavelength and cause the light to be incident on the core of each of the stretch fibers 41 to 4n are arranged.

Furthermore, as shown in FIG. 6(2), it is also possible to use a divider 3 adopting a prism pair. In this example, light is wavelength-dispersed by a pair of prisms 303, and similarly collected by the microlens array 302 and caused to be incident on the core of each of the stretch fibers 41 to 4n.

In any case, if the light is divided by the divider 3 for each wavelength and transmitted by each of the stretch fibers 41 to 4n for each wavelength to achieve the time wavelength uniqueness by adjusting the fiber length, an unintended nonlinear optical effect is prevented and the time wavelength uniqueness is not lost even when high-intensity broadband pulsed light is emitted from the pulse source 1.

Figure 7:
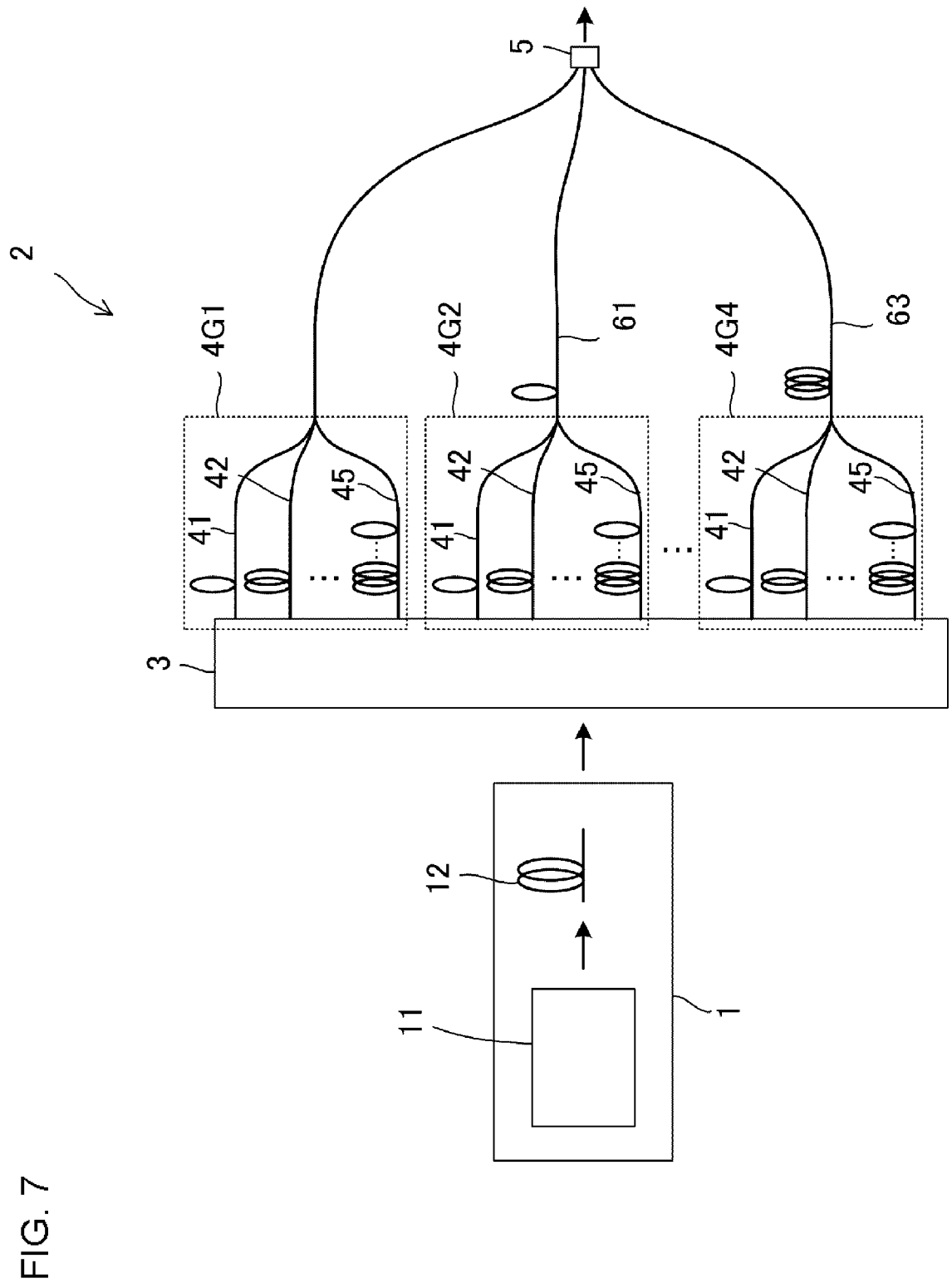
FIG. 7 is a schematic diagram of a light source apparatus for light measurement of a second embodiment.

Next, a light source apparatus for light measurement of a second embodiment will be described. FIG. 7 is a schematic diagram of the light source apparatus for light measurement of the second embodiment.

The light source apparatus for light measurement of the second embodiment is different from that of the first embodiment in a configuration of the pulse stretch unit 2. Also in the second embodiment, the pulse stretch unit 2 includes a plurality of stretch fibers. These stretch fibers and multicore fibers 61 to 6s include fibers (hereinafter, referred to as element fibers) 41 to 4r constituting each of a plurality of fiber sets 4G1 to 4Gq. In FIG. 7, s, r and q are 3, 5, and 4 respectively.

Each of the fiber sets 4G1 to 4Gq includes the plurality of element fibers 41 to 4r having the same pattern and different lengths. This is intended to achieve cost reduction by the commonality of stretch fibers. However, in this state, since there are stretch fibers having the same length, a different delay cannot be achieved in that portion. Therefore, multicore fibers 61 to 6s are combined. In this configuration, since the cores of one set of the element fibers 41 to 4r and the cores of each of the multicore fibers 61 to 6s coupled thereto form one transmission path, the number and lengths of the multicore fibers 61 to 6s are selected so that the transmission paths have different lengths.

As an example, in a case of achieving one equivalent to the 20 stretch fibers 41 to 4r (20 different transmission paths) described in the first embodiment, it is assumed that each set of the fiber sets 4G1 to 4Gq includes 5 element fibers 41 to 45 having different lengths in increments of 1 meter from 1 to 5 meters. Four sets of this are prepared. Then, three multicore fibers each having five cores are prepared. The three multicore fibers 61 to 63 have lengths of 5 meters, 10 meters, and 15 meters. Then, no multicore fiber is coupled to the first fiber set 4G1, and the multicore fiber 61 having 5 meters is coupled to the next fiber set 4G2. That is, each core of the multicore fiber 61 having 5 meters is coupled to the core of each of the element fibers 41 to 45. The multicore fiber 62 having 10 meters is coupled to the next fiber set 4G3. The multicore fiber 63 having 15 meters is coupled to the last fiber set 4G4. In this way, twenty transmission paths having different lengths in increments of 1 meter from 1 to 20 meters are formed.

The above is an example, and any combination may be used as long as the total lengths of the transmission paths are different from each other. In some cases, the number of the cores of each of the multicore fibers 61 to 6s is larger than the number of the element fibers 41 to 4r of each of the fiber sets 4G1 to 4Gq. In this case, the core may be made free (uncoupled). In a case where there are two fiber sets, one multicore fiber is sufficient.

In addition, it is also possible to use a bundle fiber instead of the multicore fibers 61 to 6s. In the above example, a bundle fiber in which five fibers are bundled is prepared. The bundle fiber has lengths of 5 meters, 10 meters, and 15 meters, and is similarly coupled to the fiber sets 4G2, 4G3, and 4G4, respectively.

In addition, although the same applies to the first embodiment, it is ideal that the number of the wavelengths divided by the divider 3 and the number of the transmission paths formed by the plurality of stretch fibers coincide with each other, but they may not coincide with each other. In a case where the number of the transmission paths is larger, a surplus transmission path becomes free. In addition, since there is a wavelength that is not used for measurement depending on the purpose of light measurement, there is a case where an unused stretch fiber is not coupled to the divider 3 for that wavelength (the number of stretch fibers is smaller).

Also in the second embodiment, since the light is divided by the divider 3 for each wavelength and transmitted by each of the stretch fibers 41 to 4r and 61 to 6s for each wavelength, an unintended nonlinear optical effect is prevented and the time wavelength uniqueness is not lost even when high-intensity broadband pulsed light is emitted from the pulse source 1.

Since the pulse stretch unit 2 includes the plurality of fiber sets 4G1 to 4Gq each including the plurality of different element fibers 41 to 4r in the same pattern, cost is reduced.

In the example shown in FIG. 7, each of the multicore fibers 61 to 63 is coupled to the subsequent stage of the fiber sets 4G2 to 4G4, but this relationship may be reversed. That is, each of the multicore fibers 61 to 63 may be coupled to the divider 3, and each of the fiber sets 4G2 to 4G4 may be coupled to the subsequent stage of the multicore fibers 61 to 63.

Next, inventions of a spectroscopic measurement apparatus and a spectroscopic measurement method will be described.

Figure 8:
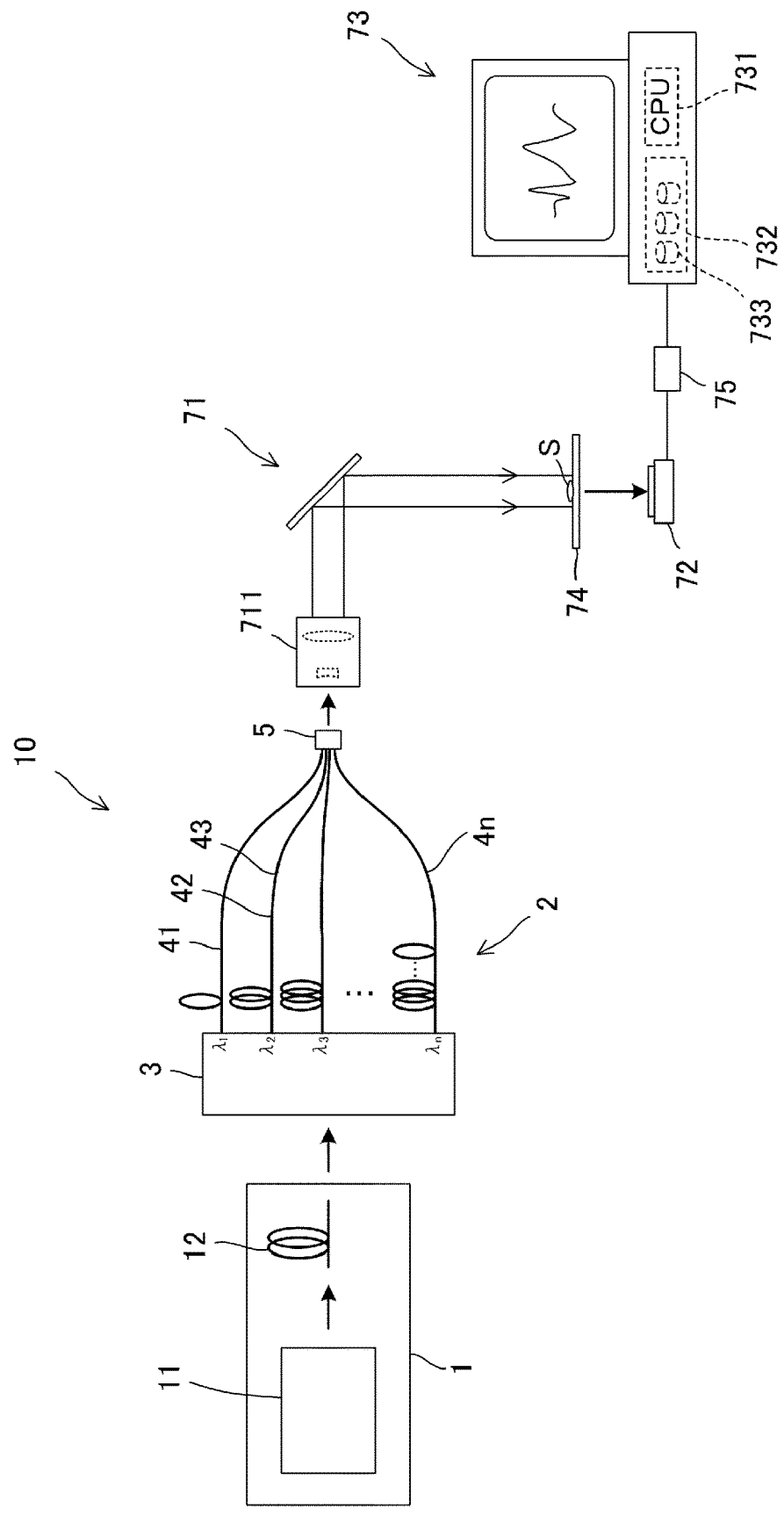
FIG. 8 is a schematic diagram of a spectroscopic measurement apparatus of a first embodiment.

FIG. 8 is a schematic diagram of the spectroscopic measurement apparatus of the first embodiment. The spectroscopic measurement apparatus shown in FIG. 8 includes a light source apparatus 10 for light measurement, an irradiation optical system 71 that irradiates an object S with light emitted from the light source apparatus 10 for light measurement, a detector 72 disposed at a position where light from the object S irradiated with the light is incident, and a calculator 73 that calculates a spectral spectrum of the object S according to an output from the detector 72.

As the light source apparatus 10 for light measurement (hereinafter, simply referred to as a light source apparatus), the light source apparatus of the first embodiment is adopted. It is a matter of course that the light source apparatus of the second embodiment may be used.

The irradiation optical system 71 includes a beam expander 711 in this embodiment. The light from the light source apparatus 10 is broadband pulsed light extended in time, but is light from the ultrashort pulse laser 11, and is in consideration of a small beam diameter. In addition, a scanning mechanism such as a galvanometer mirror may be provided to cover a wide irradiation region by beam scanning.

In this embodiment, it is assumed to measure an absorption spectrum of the object S, and thus the detector 72 is provided at a position where the transmitted light from the object S is incident. A transparent receiving plate 74 on which the object S is disposed is provided. The irradiation optical system 71 emits light from the upper side, and the detector 72 is disposed below the receiving plate 74.

As the calculator 73, a general-purpose PC is used in this embodiment. An AD converter 75 is provided between the detector 72 and the calculator 73, and an output of the detector 72 is input to the calculator 73 via the AD converter 75.

The calculator 73 includes a processor 731 and a storage (hard disk, memory, etc.) 732. In the storage 732, a measurement program 733 that processes output data from the detector 72 to calculate an absorption spectrum and other necessary programs are installed.

In this embodiment, since the light source apparatus 10 that emits the time-stretched pulsed light with the time wavelength uniqueness secured is used, the measurement program 733 is optimized accordingly. FIG. 9 is a diagram schematically showing a main part of an example of the measurement program 733 included in the spectroscopic measurement apparatus.

The example of FIG. 9 is an example of a program in which the measurement program 733 measures an absorption spectrum (spectral absorption rate). In the calculation of the absorption spectrum, reference spectrum data is used. The reference spectrum data is a value for each wavelength serving as a reference for calculating the absorption spectrum. The reference spectrum data is acquired by causing the light from the light source apparatus 10 to be incident on the detector 72 without passing through the object S. That is, the light is directly incident on the detector 72 without passing through the object S, the output of the detector 72 is input to the calculator 73 via the AD converter 75, and a value for each time resolution $\Delta t$ is acquired. Each value is stored as a reference intensity at each time ($t_1, t_2, t_3, \ldots$) for each $\Delta t$ ($V_1, V_2, V_3, \ldots$). The time resolution $\Delta t$ is an amount determined by a response speed (signal discharge cycle) of the detector 72, and means a time interval at which a signal is output.

The reference intensities $V_1, V_2, V_3, \ldots$ at the times $t_1, t_2, t_3, \ldots$ are intensities (spectra) of the corresponding wavelengths $\lambda_1, \lambda_2, \lambda_3, \ldots$. The relationships between the times $t_1, t_2, t_3, \ldots$ and the wavelengths in one pulse are examined in advance, and it is handled that the values $V_1, V_2, V_3, \ldots$ at the times are values of $\lambda_1, \lambda_2, \lambda_3, \ldots$.

Then, when the light having passed through the object S is incident on the detector 72, the output from the detector 72 similarly passes through the AD converter 75 and is stored in the memory as the value (measurement value) of each of the times $t_1, t_2, t_3, \ldots$ ($v_1, v_2, v_3, \ldots$). Each measurement value is compared with the reference spectrum data ($v_1/V_1, v_2/V_2, v_3/V_3, \ldots$) and the result is the absorption spectrum (taking the logarithm of each inverse as appropriate). The measurement program 733 is programmed so as to perform the arithmetic processing as described above.

Next, the operation of the spectroscopic measurement apparatus will be described. The following description is also a description of embodiments of the spectroscopic measurement method. In the case of performing spectroscopic measurement using the spectroscopic measurement apparatus of the embodiment, the light source apparatus 10 is operated in a state where the object S is not disposed, and the output data from the detector 72 is processed to acquire the reference spectrum data in advance. Then, the object S is disposed on the receiving plate 74, and the light source apparatus 10 is operated again. Then, the output data from the detector 72 is input to the calculator 73 via the AD converter 75, and the spectroscopic spectrum is calculated by the measurement program 733.

In the above example, the absorption spectrum is measured using the transmitted light from the object S, but a reflection spectrum (spectral reflectance) may be measured by causing the reflected light from the object S to be incident on the detector 72, or a fluorescence spectrum may be measured by causing fluorescence emitted by being excited by the light radiated to the object S to be incident on the detector 72. Furthermore, the spectral characteristic may be measured for a scattering spectrum such as a Rayleigh scattering or a Raman scattering of the object S. Therefore, the light from the object S may be transmitted light, reflected light, fluorescence, scattered light, or the like from the object S irradiated with light.

When the measurement of the light source apparatus 10 and the sensitivity characteristic of the detector 72 change with time, measurement for acquiring the reference spectrum (measurement in a state where the object S is not disposed) is performed, and calibration work for updating the reference spectrum is periodically performed.

According to the spectroscopic measurement apparatus and the spectroscopic measurement method of the embodiment as described above, since the light from the pulsed light source 1 is temporally divided and radiated to the object S, a time-consuming operation such as sweeping of the diffraction grating is unnecessary, and spectroscopic measurement at high speed can be performed. Further, when pulse stretch is performed with the time wavelength uniqueness secured, since a configuration is adopted in which transmission is performed for each wavelength by the different stretch fibers 41 to 4r having different lengths, the time wavelength uniqueness is not lost even when the object S is irradiated with light with high illuminance. For this reason, it is possible to perform spectroscopic measurement that requires irradiation with high-power light with high accuracy, such as spectroscopic measurement for an object S having a large amount of absorption, and a spectroscopic measurement apparatus and a spectroscopic measurement method with high speed and high reliability are obtained.

Figure 10:
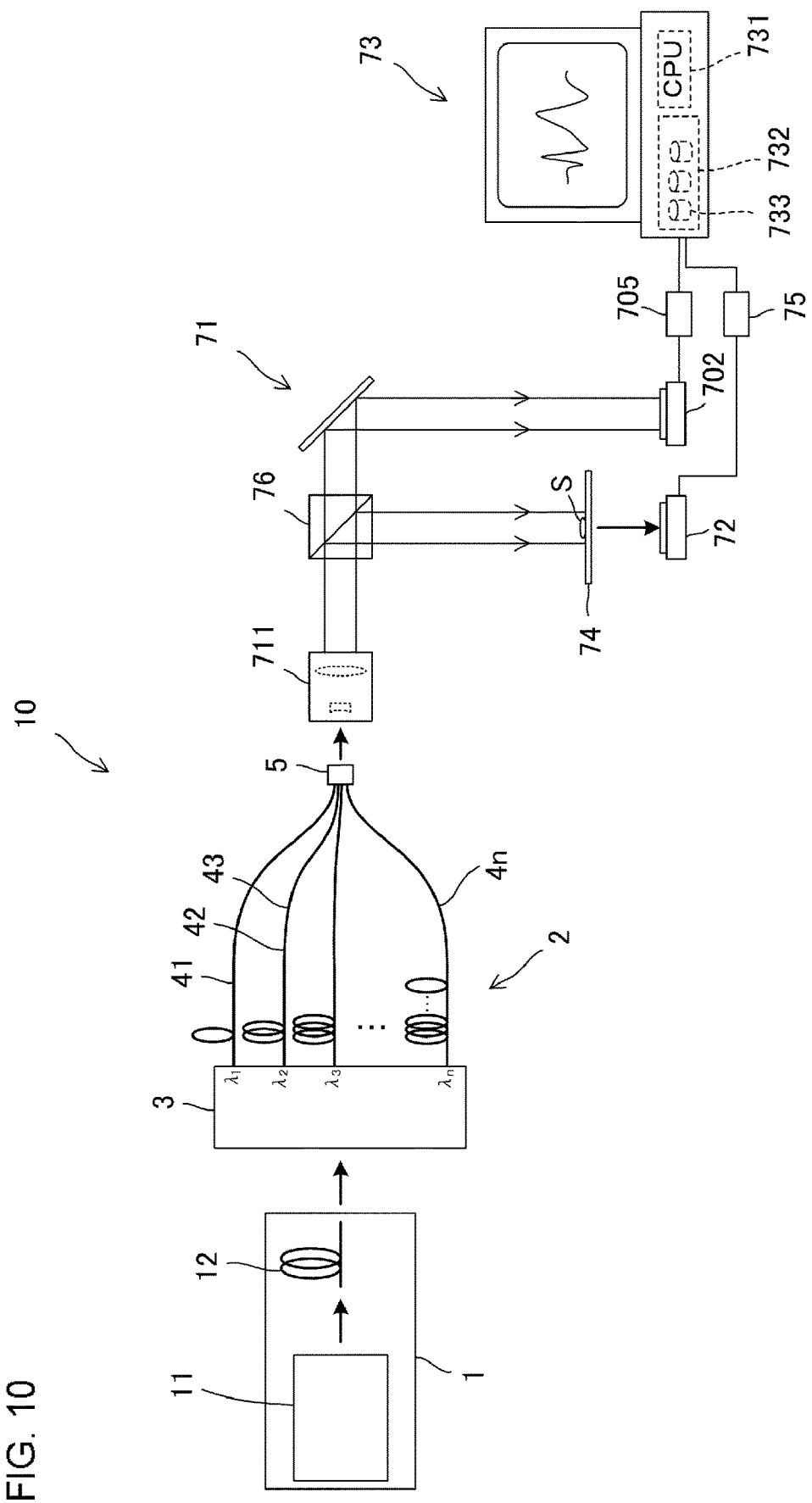
FIG. 10 is a schematic diagram of a spectroscopic measurement apparatus of the second embodiment.

Next, a spectroscopic measurement apparatus and a spectroscopic measurement method of a second embodiment will be described. FIG. 10 is a schematic diagram of the spectroscopic measurement apparatus of the second embodiment.

As shown in FIG. 10, the spectroscopic measurement apparatus of the second embodiment is provided with a branching element 76 that branches the light emitted from the light source apparatus 10. As the branching element 76, a beam splitter is used in this embodiment.

The branching element 76 divides an optical path from the light source apparatus 10 into a measurement optical path and a reference optical path. In the measurement optical path, as in the first embodiment, the receiving plate 74 is disposed, and the measurement detector 72 is disposed at a position on the receiving plate 74 where the light transmitted through the object S is received.

A reference detector 702 is disposed on the reference optical path. Light that is branched by the branching element 76 and travels through the reference optical path is incident on the reference detector 702 as it is. The light (reference light) is incident on the reference detector 702 without passing through the object S to obtain reference spectrum data in real time.

The measurement detector 72 and the reference detector 702 are connected to the calculator 73 via the AD converters 75 and 705, respectively. The measurement program 733 in the calculator 73 is programmed to perform real-time reference intensity spectrum reference. That is, the measurement values $v_1, v_2, v_3, \ldots$ at the times $t_1, t_2, t_3, \ldots$ are input from the measurement detector 72, and the reference intensities $V_1, V_2, V_3, \ldots$ (reference spectrum data) at the times $t_1, t_2, t_3, \ldots$, which are the same times, are input from the reference detector 72. The measurement program 733 calculates $v_1/V_1, v_2/V_2, v_3/V_3, \ldots$ according to the relationships between the times $t_1, t_2, t_3, \ldots$ and the wavelengths $\lambda_1, \lambda_2, \lambda_3, \ldots$ in one pulse examined in advance, and sets the calculated $v_1/V_1, v_2/V_2, v_3/V_3, \ldots$ as an absorption spectrum. The reflection spectrum and the scattering spectrum can be measured similarly by reference spectrum data acquired in real time.

In the spectroscopic measurement method of the second embodiment using the spectroscopic measurement apparatus of the second embodiment, since the reference spectrum data is acquired in real time, the reference spectrum data is not periodically acquired. This embodiment is the same as the first embodiment except for this point.

According to the spectroscopic measurement apparatus and the spectroscopic measurement method of the second embodiment, it is unnecessary to separately acquire the reference spectrum data, so that the efficiency of the entire measurement work is increased. In addition, in the first embodiment, in a case where the characteristic of the light source apparatus 10 and the characteristic of the detector 72 are likely to change, it is necessary to frequently perform the calibration work, but it is unnecessary in the second embodiment. Even if the characteristic of the light source apparatus 10 and the characteristic of the detector 72 do not change, in a case where the measurement environment is different (for example, in a case where the temperature condition, the condition of background light, and the like are different), the calibration work may be required. In the second embodiment, since the calibration work is unnecessary even in such a case, measurement efficiency is high. However, in the second embodiment, since the light flux from the light source apparatus 10 is divided into two, the light flux that can radiate the object S is reduced by that amount. Therefore, in a case where it is necessary to perform measurement by irradiating the object S with higher intensity, the first embodiment is more advantageous.

Applications of the light source apparatus for light measurement include various light measurements in addition to the spectroscopic measurement described above. For example, it can be said that an application of observing an object by irradiating the object with light like a microscope is also a type of light measurement, and it can be said that a case of measuring a distance by irradiating the object with light is also a type of light measurement. The light source apparatus for light measurement of the invention of the present application can be used for such various light measurements.

The continuous spectrum over a certain wavelength width included in the wavelength range of 900 to 1300 nm has a meaning of being suitable for light measurement in the near-infrared range particularly effective for material analysis and the like. However, there are various spectroscopic measurements other than this wavelength range, and the spectroscopic measurement apparatus and the spectroscopic measurement method are not limited to this wavelength range.

In addition, the wavelength width of the continuous spectrum is set to at least 10 nm, but this is also an example, and pulsed light continuous with a wavelength width narrower than that may be used. For example, in a case where an object is a gas and only measurement of a specific component (specific absorption spectrum) is required as in the analysis of atmospheric components, pulsed light continuous with a narrow wavelength width may be used.

The invention claimed is:

1. A light source apparatus for light measurement structured to output pulsed light having a continuous spectrum, the light source apparatus comprising:
   a pulsed light source structured to emit pulsed SC light which is a super continuum light;
   a divider structured to spatially divide the pulsed light emitted from the pulsed light source into a plurality of optical paths according to a wavelength; and
   a plurality of fibers in a number corresponding to a number of wavelengths divided by the divider,
   wherein the pulsed light source includes an ultrashort pulse laser structured to generate an ultrashort pulsed light and a nonlinear element which broadens the spectrum of the ultrashort pulsed light by a nonlinear optical effect so as to generate the pulsed SC light,
   wherein the divider is an arrayed waveguide grating,
   wherein each of the plurality of fibers is a single-mode fiber and has an incident end located at a position where light having a corresponding wavelength spatially divided by the divider is incident, and the plurality of fibers have different length according to the wavelength of the incident light, and wherein the arrayed waveguide grating divides the pulsed SC light emitted from the pulsed light source such that energy of incident light to each of the plurality of fibers is less than 0.19 µJ.
such that an elapsed time and a wavelength in one pulse correspond to each other on a one-to-one basis.

2. The light source apparatus for light measurement according to claim 1, wherein each of the plurality of fibers has a normal dispersion in a wavelength range of a corresponding incident light.

3. The light source apparatus for light measurement according to claim 1, further comprising a coupler provided at the emission end of each of the plurality of fibers and that superimposes beams emitted from the plurality of fibers so as to be radiated to the same irradiation region.

4. A light source apparatus for light measurement structured to output pulsed light having a continuous spectrum in which an elapsed time and a wavelength in one pulse correspond to each other on a one-to-one basis, the light source apparatus comprising:
a pulsed light source structured to emit pulsed light having a continuous spectrum;
a divider structured to spatially divide the pulsed light emitted from the pulsed light source into a plurality of optical paths according to a wavelength; and
a plurality of fibers in a number corresponding to a number of wavelengths divided by the divider,
wherein each of the plurality of fibers has an incident end located at a position where light having a corresponding wavelength spatially divided by the divider is incident, and the plurality of fibers have different length according to the wavelength of the incident light,
wherein the plurality of fibers include a plurality of fiber sets and a multicore fiber,
wherein each of the plurality of fiber sets includes a plurality of element fibers having the same pattern and different lengths,
wherein cores of the plurality of element fibers in one of the plurality of fiber sets are coupled to corresponding cores of the multicore fiber respectively, and
wherein the cores of the element fibers and the cores of the multicore fiber constitute transmission paths, and a number and a length of the multicore fiber are determined such that lengths of the transmission paths are different from each other.

5. The light source apparatus for light measurement according to claim 4, wherein the pulsed light source is a light source structured to emit the pulsed light that is super continuum light.

6. A spectroscopic measurement apparatus comprising:
a pulsed light source structured to emit pulsed SC light which is a super continuum light;
a divider structured to spatially divide the pulsed light emitted from the pulsed light source into a plurality of optical paths according to a wavelength;
a plurality of fibers in a number corresponding to a number of wavelengths divided by the divider, wherein each of the plurality of fibers is a single-mode fiber and has an incident end located at a position where light having a corresponding wavelength spatially divided by the divider is incident, lengths of the fibers are different according to the wavelength of the incident light such that an elapsed time and the wavelength in one pulse correspond to each other on a one-to-one basis;
a detector disposed at a position where light from an object irradiated with light emitted from each of the plurality of the fibers is incident; and
a calculator structured to calculate a spectral characteristic of the object according to an output from the detector, wherein the pulsed light source includes an ultrashort pulse laser structured to generate an ultrashort pulsed light and a nonlinear element which broadens the spectrum of the ultrashort pulsed light by a nonlinear optical effect so as to generate the pulsed SC light, wherein the divider is an arrayed waveguide grating,
and wherein the arrayed waveguide grating divides the pulsed SC light emitted from the pulsed light source such that energy of incident light to each of the plurality of fibers is less than 0.19 µJ.

7. The spectroscopic measurement apparatus according to claim 6, wherein each of the plurality of fibers has a normal dispersion in a wavelength range of a corresponding incident light.

8. A spectroscopic measurement apparatus comprising:
a pulsed light source structured to emit pulsed light having a continuous spectrum;
a divider structured to spatially divide the pulsed light emitted from the pulsed light source into a plurality of optical paths according to a wavelength;
a plurality of fibers in a number corresponding to a number of wavelengths divided by the divider, wherein each of the plurality of fibers has an incident end located at a position where light having a corresponding wavelength spatially divided by the divider is incident, lengths of the fibers are different according to the wavelength of the incident light such that an elapsed time and the wavelength in one pulse correspond to each other on a one-to-one basis;
a detector disposed at a position where light from an object irradiated with light emitted from each of the plurality of the fibers is incident; and
a calculator structured to calculate a spectral characteristic of the object according to an output from the detector,
wherein the plurality of fibers includes a plurality of fiber sets and a multicore fiber,
wherein each of the plurality of fiber sets includes a plurality of element fibers having the same pattern and different lengths, and
wherein cores of the plurality of element fibers in one of the plurality of fiber sets are coupled to corresponding cores of the multicore fiber respectively, the cores of the element fibers and the cores of the multicore fiber constitute transmission paths, and a number and a length of the multicore fiber are determined such that lengths of the transmission paths are different from each other.

9. The spectroscopic measurement apparatus according to claim 8, wherein the pulsed light source is a light source structured to emit the pulsed light that is super continuum light.

10. A spectroscopic measurement method comprising:
generating a pulsed SC light which is a super continuum light;
a division step of spatially dividing the pulsed SC light by a divider according to a wavelength;
a pulse stretch step of causing beams of the pulsed SC light divided in the division step to be incident on and transmitted to a plurality of fibers in a number corresponding to a number of divided wavelengths, respectively, such that an elapsed time and the wavelength in one pulse correspond to each other on one-to-one basis;

an irradiation step of irradiating an object with the pulsed light having a pulse width stretched by the pulse stretch step;

a detection step of detecting, by a detector, light from the object irradiated with the pulsed light having the pulse width stretched by the pulse stretch step; and a calculation step of calculating a spectral characteristic of the object according to an output from the detector, wherein the generating the pulsed SC light includes:
  generating an ultrashort pulsed light; and
  broadening the spectrum of the ultrashort pulsed light by a nonlinear optical effect so as to generate the pulsed SC light, and wherein the division step divides the pulsed SC light such that energy of incident light to each of the plurality of fibers is less than 0.19 µJ.

11. The spectroscopic measurement method according to claim 10, wherein the divider is an arrayed waveguide grating.

12. The spectroscopic measurement method according to claim 10, wherein the divider includes a diffraction grating and an optical system that condenses light dispersed by the diffraction grating at different positions according to the wavelength, and an incident end of each of the fibers is disposed at a corresponding focus position.

13. A spectroscopic measurement method comprising:

a division step of spatially dividing pulsed light having a continuous spectrum by a divider according to a wavelength;

a pulse stretch step of causing beams of the pulsed light divided in the division step to be incident on and transmitted to a plurality of fibers in a number corresponding to a number of divided wavelengths, respectively, such that an elapsed time and the wavelength in one pulse correspond to each other on one-to-one basis;

an irradiation step of irradiating an object with the pulsed light having a pulse width stretched by the pulse stretch step;

a detection step of detecting, by a detector, light from the object irradiated with the pulsed light having the pulse width stretched by the pulse stretch step; and a calculation step of calculating a spectral characteristic of the object according to an output from the detector, wherein the plurality of fibers includes a plurality of fiber sets and a multicore fiber, wherein each of the plurality of fiber sets includes a plurality of element fibers having the same pattern and different lengths, and wherein cores of the element fibers in one of the plurality of fiber sets are coupled to cores of the multicore fiber respectively, the cores of the element fibers and the cores of the multicore fiber constitute transmission paths, and a number and a length of the multicore fiber are determined such that lengths of the transmission paths are different from each other.

14. The spectroscopic measurement method according to claim 13, wherein the pulsed light is super continuum light.

* * * * *